US010771343B2

(12) United States Patent
Aleshire

(10) Patent No.: US 10,771,343 B2
(45) Date of Patent: Sep. 8, 2020

(54) SYSTEM, METHOD, AND COMPUTER-IMPLEMENTED METHOD FOR STANDARDIZING ELECTRONIC IDENTIFIERS TO IMPROVE IDENTIFICATION OF PHYSICAL EQUIPMENT

(71) Applicant: Mastercard International Incorporated, Purchase, NY (US)

(72) Inventor: Chase A. Aleshire, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 16/182,120

(22) Filed: Nov. 6, 2018

(65) Prior Publication Data
US 2020/0145295 A1 May 7, 2020

(51) Int. Cl.
*H04L 12/24* (2006.01)
*H04L 29/12* (2006.01)

(52) U.S. Cl.
CPC .............. *H04L 41/12* (2013.01); *H04L 41/02* (2013.01); *H04L 61/3015* (2013.01); *H04L 61/3065* (2013.01)

(58) Field of Classification Search
CPC ..... H04L 41/12; H04L 41/02; H04L 61/3015; H04L 61/3065
See application file for complete search history.

(56) References Cited

U.S. PATENT DOCUMENTS

2012/0249588 A1* 10/2012 Tison ................... G06F 1/1696
345/633
2015/0304399 A1* 10/2015 Kramer ................. G06F 9/4843
713/162

OTHER PUBLICATIONS

CISCO USC Manager GUI Configuration Guide, Release 2.0, Sep. 4, 2012. (Year: 2012).*

* cited by examiner

Primary Examiner — Stephen J Clawson
(74) Attorney, Agent, or Firm — Hovey Williams LLP

(57) ABSTRACT

A system, method, and computer-implemented method for automatically and robustly standardizing electronic equipment identifiers with service profile identifiers in a domain of a unified computing system to better facilitate identification of the physical equipment. A particular domain in a domain list may be accessed, and a service profile identifier list of service profile identifiers and an equipment identifier list of equipment identifiers for the particular domain may be accessed. If a particular equipment identifier assigned to a particular piece of equipment (e.g., a blade server) does not include the particular service profile identifier assigned to that equipment, then the particular equipment identifier is changed to include the particular service profile identifier to facilitate identification of the physical equipment. Each service profile identifier in the particular domain is checked, and the process is repeated for any additional domains. The entire process may be repeated at a regular interval (e.g., nightly).

12 Claims, 3 Drawing Sheets

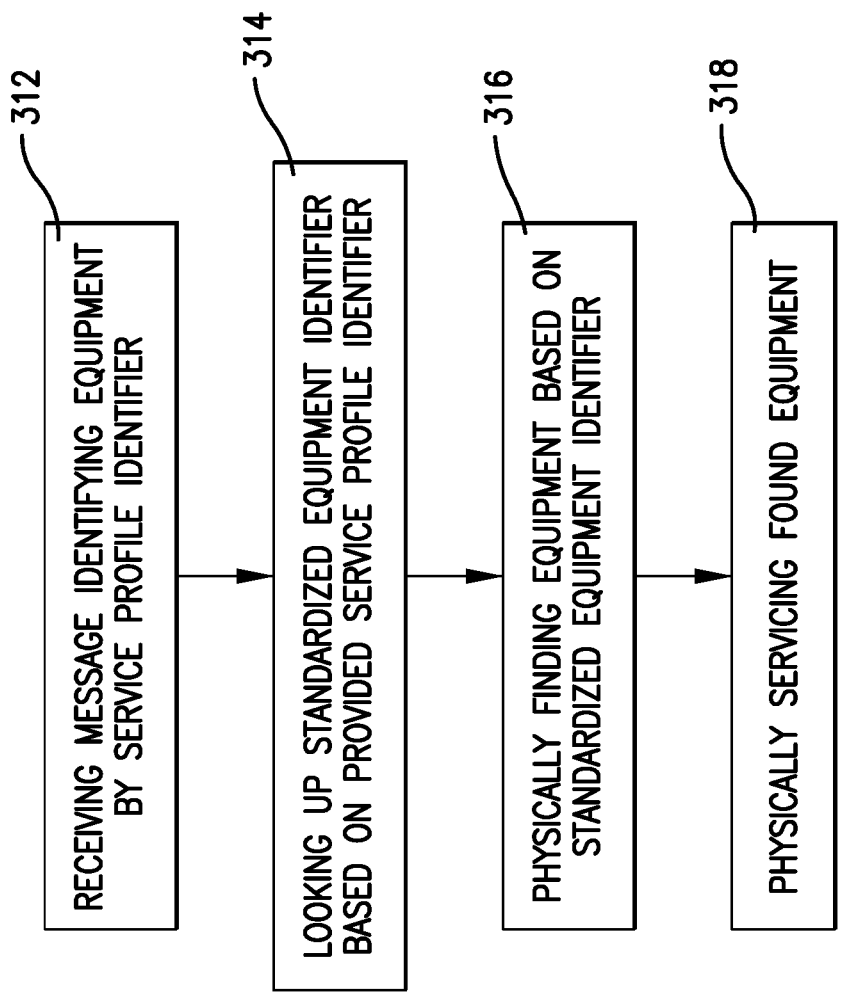

Figure 1:
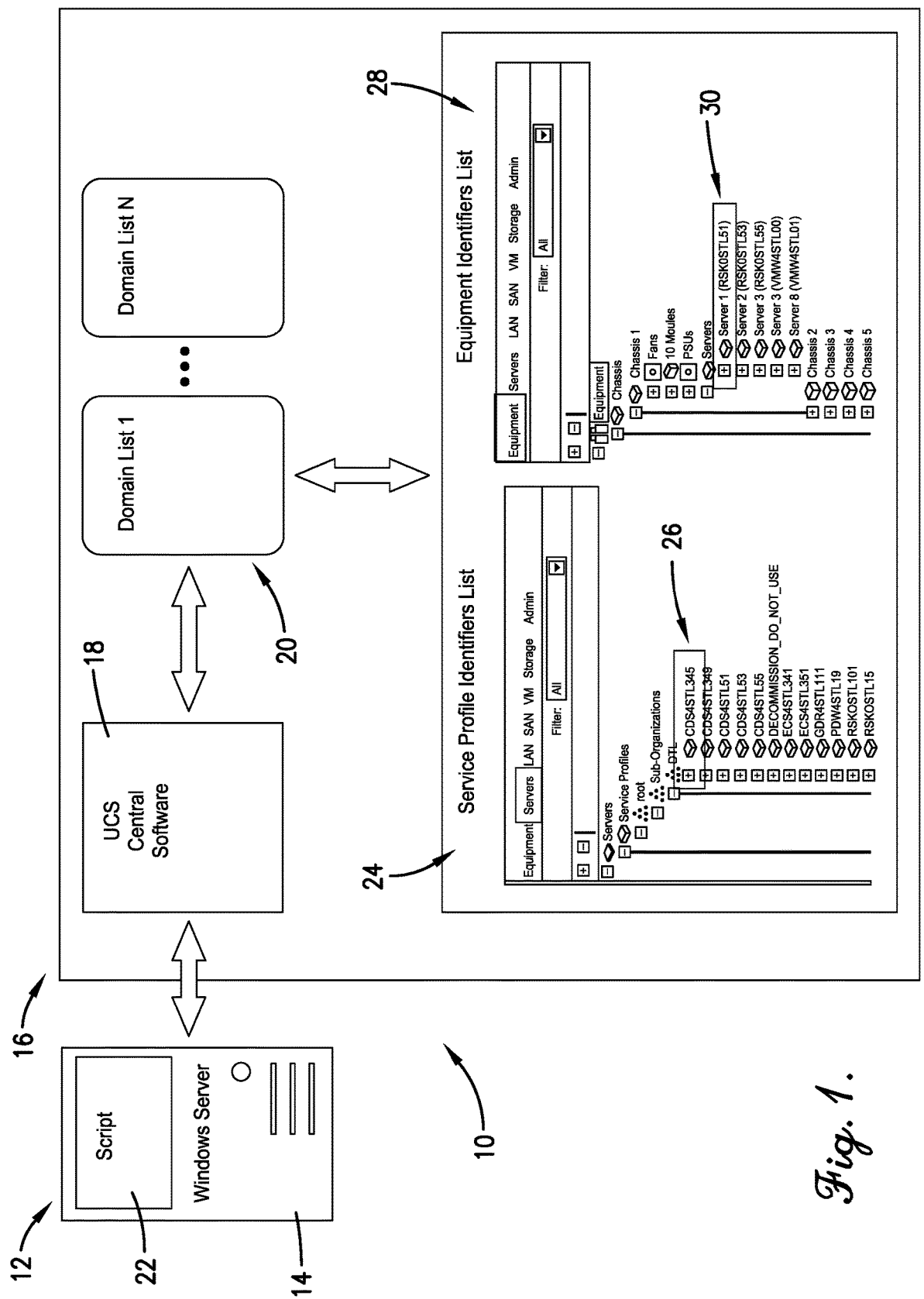

SYSTEM, METHOD, AND COMPUTER-IMPLEMENTED METHOD FOR STANDARDIZING ELECTRONIC IDENTIFIERS TO IMPROVE IDENTIFICATION OF PHYSICAL EQUIPMENT

FIELD

The present invention relates to systems, methods, and computer-implemented methods for managing electronic equipment, and more particularly, embodiments concern a system, method, and computer-implemented method for automatically and robustly standardizing electronic equipment identifiers with service profile identifiers within the domains of a unified computing system to better facilitate identification of the physical equipment.

BACKGROUND

The Cisco Unified Computing System™ (Cisco UCS®) is a data center server computer product line which includes computing hardware, virtualization support, switching fabric, and management software. A UCS may include blade servers, which are server computers having a modular design and a reduced number of components to minimize physical space requirements and power consumption while still having all of the functional components to be considered computers. An active blade server has a service profile identifier which identifies the logical configuration applied to the physical equipment, and an equipment identifier which identifies the physical equipment itself.

Ideally, the equipment identifier matches or at least includes the service profile identifier, so that when a particular blade server is called out by its service profile identifier, a technician can quickly and easily identify the correct physical equipment by its corresponding equipment identifier. Normally, assigning equipment identifiers to blade servers in a UCS requires separately logging-in to each blade server and manually performing the labelling process, which can be time-consuming if there are a large number of blade servers or the service profile identifiers change frequently. Without proper equipment identifiers, there is an increased risk of identifying the wrong physical equipment. Further, errors can occur when manually configuring these identifiers, or non-standard identifiers may be applied, which can also increase the risk of identifying the wrong physical equipment.

This background discussion is intended to provide information related to the present invention which is not necessarily prior art.

SUMMARY

Embodiments address the above-described and other problems and limitations in the prior art by providing a system, method, and computer-implemented method for automatically and robustly standardizing electronic equipment identifiers with service profile identifiers within the one or more domains of a UCS to better facilitate identification of the physical equipment.

In a first embodiment, a computer-implemented method is provided for improving the function of a UCS by standardizing equipment identifiers with service profile identifiers in a domain of the UCS. The method may include the following steps, at least some of which may be performed by a computer having an electronic processor. A domain list of one or more domains in the UCS may be accessed, and a particular domain from the one or more domains in the domain list may be accessed. A service profile identifier list of one or more service profile identifiers for the particular domain may be accessed, and whether a particular service profile identifier in the service profile list is assigned to a particular piece of equipment may be determined. An equipment identifier list of one or more equipment identifiers for the particular domain may be accessed, and a particular equipment identifier in the equipment identifier service list assigned to the particular piece of equipment may be found. If the particular equipment identifier assigned to the particular piece of equipment does not include the particular service profile identifier assigned to the particular piece of equipment, then the particular equipment identifier assigned to the particular piece of equipment may be changed to include the particular service profile identifier assigned to the particular piece of equipment.

In a second embodiment, a method is provided to facilitate identifying pieces of equipment in a domain of a UCS by standardizing equipment identifiers for the pieces of equipment with service profile identifiers assigned to the pieces of equipment. The method may include the following steps. A domain list of one or more domains in the UCS may be accessed, and a particular domain from the one or more domains in the domain list may be accessed. A service profile identifier list of one or more service profile identifiers for the particular domain may be accessed, and whether a particular service profile identifier in the service profile list is assigned to a particular piece of equipment may be determined. An equipment identifier list of one or more equipment identifiers for the particular domain may be accessed, and a particular equipment identifier in the equipment identifier service list assigned to the particular piece of equipment may be found. If the particular equipment identifier assigned to the particular piece of equipment does not include the particular service profile identifier assigned to the particular piece of equipment, then the particular equipment identifier maybe changed to include the particular service profile identifier. Thereafter, a message identifying the particular piece of equipment by the particular server profile identifier may be received. The particular equipment identifier may be looked-up based on the particular service profile identifier, the particular piece of equipment may be physically found based on the particular equipment identifier, and the particular piece of equipment may be physically serviced.

In a third embodiment, a system may include a UCS and a management network. The UCS may include a domain list of one or more domains in the UCS. Each domain in the domain list may be associated with a service profile identifier list of one or more service profile identifiers, and an equipment identifier list of one or more equipment identifiers. The management network may be configured to manage the UCS, and may include a script configured to perform the following actions. The domain list of the one or more domains in the unified computing system may be accessed, and a particular domain from the one or more domains in the domain list may be accessed. The service profile identifier list of the one or more service profile identifiers for the particular domain may be accessed, and whether a particular service profile identifier in the service profile identifier list is assigned to a particular piece of equipment may be determined. The equipment identifier list of the one or more equipment identifiers for the particular domain may be accessed, and a particular equipment identifier in the equipment may be found. If the particular equipment identifier assigned to the particular equipment does not include the particular service profile identifier assigned to the particular piece of equipment, then the particular equipment identifier assigned to the particular piece of equipment may be changed to include the particular service profile identifier assigned to the particular piece equipment.

Various implementations of the foregoing embodiments may include any one or more the following additional or alternative features. Some or all steps or actions may be performed by a script executed by a task scheduler on a computer server which is part of a management network for managing the UCS. The particular piece of equipment may be a blade server. The particular equipment identifier may be set to a default equipment identifier if the particular piece of equipment has no assigned particular service profile identifier. Relevant steps or actions may be repeated for each service profile identifier and each equipment identifier for the particular domain. Relevant steps or actions may be repeated for each domain of the one or more domains in the domain list. All of the steps or actions may be repeated at a regular interval.

This summary is not intended to identify essential features of the present invention, and is not intended to be used to limit the scope of the claims. These and other aspects of the present invention are described below in greater detail.

DRAWINGS

Figure 2:
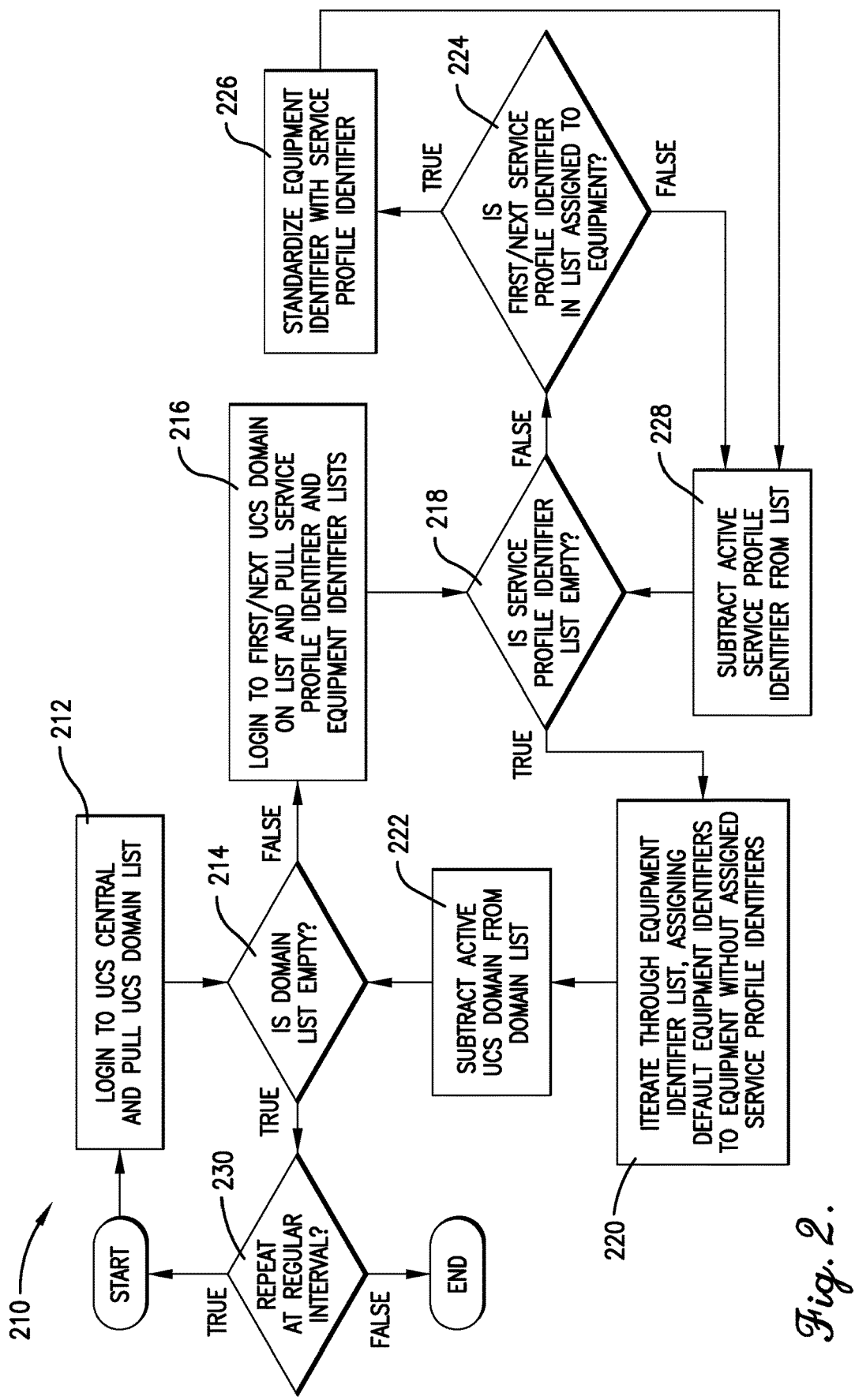

Embodiments of the present invention are described in detail below with reference to the attached drawing figures, wherein:

FIG. 1 is a diagram of an embodiment of a system for automatically and robustly standardizing electronic equipment identifiers with service profile identifiers in the one or more domains of a UCS to better facilitate identification of the physical equipment; and FIG. 2 is a flowchart of an embodiment of a method and/or computer-implemented method for automatically and robustly standardizing electronic equipment identifiers with service profile identifiers in the one or more domains of a UCS to better facilitate identification of the physical equipment; and FIG. 3 is a flowchart of additional steps in an implementation of the method of FIG. 2.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a system, method, and computer-implemented method for automatically and robustly standardizing electronic equipment identifiers with service profile identifiers within the one or more domains of a UCS to better facilitate identification of the physical equipment. The standardization process is performed automatically, thereby avoiding the time and cost disadvantages of the prior art manual process and reducing the risks of missing, incorrect, and non-standard equipment identifiers. The standardization process is also performed robustly, in that the process is repeated at regular intervals (e.g., nightly) to account for any changes to service profile identifiers and to correct any improper changes to equipment identifiers during the preceding interval, thereby further reducing the risks of missing, incorrect, and non-standard equipment identifiers.

Referring to FIG. 1, an embodiment of a system 10 is shown for automatically and robustly standardizing electronic equipment identifiers with service profile identifiers in the one or more domains of a UCS to better facilitate identification of the physical equipment. The system 10 may broadly include a management network 12 including a management server 14, and a UCS 16 including a UCS central software 18 and one or more Domain Lists 20. The management network 12 including the management server 14 may be otherwise substantially conventional technologies configured to manage certain operations of the UCS 16. For example, the management server 14 may include a Windows server executing a Windows task scheduler, and the task scheduler may initiate a master script for the UCS 16. The task scheduler may also execute a script 22 implementing the standardization process.

The UCS 16 and the UCS central software 18 may be otherwise substantially conventional UCS technologies. The UCS 16 may include one or more domains, with each domain including one or more active and/or inactive blade servers or other electronic equipment. The Domain List 20 may be a list of the active domains managed by the UCS central software 18. Each domain in the Domain List 20 may be associated with a Service Profile List 24, which may be a list of all of the active Service Profile identifiers 26 for the domain. Each domain in the Domain List 20 may also be associated with an Equipment Identifier List 28, which may be a list of all of the active Equipment identifiers 30 for the domain.

Referring also to FIG. 2, in operation the system 10 may broadly function substantially as follows. A Domain List 20 of the one or more domains of the UCS 16 may be accessed, as shown in 212, and a particular domain from the one or more domains in the Domain List 20 may be accessed, and a Service Profile Identifier List 24 of Service Profile Identifiers 26 and an Equipment Identifier List 28 of Equipment Identifiers 30 for the particular domain may be accessed, as shown in 216. If a particular Equipment Identifier 30 assigned to a particular piece of equipment (e.g., a blade server) does not include the particular Service Profile Identifier 26 assigned to that equipment, then the particular Equipment Identifier 30 may be changed to include the particular Service Profile Identifier 26, as shown in 226, to facilitate identification of the physical equipment. Each Service Profile Identifier 24 in the particular domain may be checked, as shown in 218, and the process may be repeated for any additional domains, as shown in 214. The entire process may be repeated at a regular interval (e.g., nightly), as shown in 230.

The system 10 may include more, fewer, or alternative components and/or perform more, fewer, or alternative actions, including those discussed elsewhere herein, and particularly those discussed in the following section describing the method and computer-implemented method.

Referring to FIGS. 2 and 3, an embodiment of a method and/or computer-implemented method 210 is shown for improving the function of a UCS by automatically and robustly standardizing electronic equipment identifiers with service profile identifiers in the one or more domains of the UCS to better facilitate identification of the physical equipment. The method and/or computer-implemented method 210 may be a corollary to the functionality of the above-described system 10, and may be similarly implemented using the various components of the above-described system 10 and its exemplary operating environment. In particular, at least some of which may be performed by a computer having an electronic processor. For example, some or all of the steps of the computer-implemented method 210 may be performed by the script 22 executed by the management server 14 which is part of the management network 12 for managing certain operations of the UCS 16. Broadly, the method and/or computer-implemented method 210 may include the following steps.

A UCS central software 18 may be accessed (by, e.g., logging in), and a Domain List 20 may be accessed via the UCS central software 18, as shown in 212. The Domain List 20 may be checked to determine whether it is empty, as shown in 214. If the Domain List 20 is empty, then the method 210 may end. If the Domain List 20 is not empty, then a particular domain in the Domain List 20 may be accessed (by, e.g., logging in), and a Service Profile Identifier List 24 and an associated Equipment Identifier List 28 for the particular domain may be accessed, as shown in 216.

The Service Profile Identifier List 24 may be checked to determine whether it is empty, as shown in 218. If the Service Profile Identifier List 24 for the particular domain is empty, then any Equipment Identifiers 30 in the Equipment Identifier List 28 may be set to default Equipment Identifiers, as shown in 220, and the particular domain may be subtracted from the Domain List 20, as shown in 222, and the Domain List 20 may be checked for a next particular domain, as shown in 214.

If the Service Profile Identifier List 24 for the particular domain is not empty, then a particular Service Profile Identifier 26 in the Service Profile Identifier List 24 may be checked to determine whether it is assigned to a piece of electronic equipment, as shown in 224. If the particular Service Profile Identifier 26 in the Service Profile Identifier List 24 is not assigned to a piece of electronic equipment, then the particular Service Profile Identifier 26 may be subtracted from the Service Profile Identifier List 24, as shown in 228, and the Service Profile Identifier List 24 may be checked for the next particular Service Profile Identifier 26, as shown in 218.

If the particular Service Profile Identifier 26 in the Service Profile Identifier List 24 is assigned to a piece of electronic equipment, then the Equipment Identifier 30 of that piece of electronic equipment may be set, in part or in whole, to the Service Profile Identifier 26, as shown in 226. More specifically, if a particular Equipment Identifier 30 assigned to a particular piece of equipment (e.g., a blade server) does not include the particular Service Profile Identifier 26 assigned to that equipment, then the particular Equipment Identifier 30 may be changed to include the particular Service Profile Identifier 26, as shown in 226, to facilitate identification of the physical equipment. In one implementation, this may be accomplished by simply overwriting the Equipment Identifier 30 with the standardized label without first checking whether the Equipment Identifier 30 is already standardized. In another implementation, this may be accomplished by first checking whether the Equipment Identifier 30 is already standardized, and overwriting it only if it is not already standardized. The relevant effect of these two implementations may be the same: Standardizing any unstandardized Equipment Identifiers 30 so that all Equipment Identifiers 30 with a corresponding Service Profile Identifier 26 are standardized. Thereafter, the particular Service Profile Identifier 26 may be subtracted from the Service Profile Identifier List 24, as shown in 228, and the Service Profile Identifier List 24 may be checked for the next particular Service Profile Identifier 26, as shown in 218.

The method and/or computer-implemented method 210 may be repeated at a regular interval (e.g., nightly) to ensure that the Equipment Identifier 30 for each piece of electronic equipment continues to correctly reflect the Service Profile Identifier 26 of that piece of electronic equipment, as shown in 230.

Once the Equipment Identifiers 30 have been standardized to better facilitate identification of the physical equipment, a message (e.g., a service request) may be received identifying a particular piece of equipment by its particular Server Profile Identifier 26, as shown in 312. The particular Equipment Identifier 30 may be looked-up based on the provided particular Service Profile Identifier 26, as shown in 314. The particular piece of equipment may then be quickly and easily physically found based on the particular Equipment Identifier 30, as shown in 316, and the correct particular piece of equipment may be physically serviced, as shown in 318.

The method and/or computer-implemented method 210 may include more, fewer, or alternative actions, including those discussed elsewhere herein.

Any actions, functions, steps, and the like recited herein may be performed in the order shown in the figures and/or described above, or may be performed in a different order. Furthermore, some steps may be performed concurrently as opposed to sequentially. Although the computer-implemented method is described above, for the purpose of illustration, as being executed by an exemplary system and/or exemplary physical elements, it will be understood that the performance of any one or more of such actions may be differently distributed without departing from the spirit of the present invention.

A computer-readable medium comprising a non-transitory medium may include an executable computer program stored thereon and for instructing one or more processing elements to perform some or all of the steps described herein, including some or all of the steps of the computer-implemented method. The computer program stored on the computer-readable medium may instruct the processing element and/or other components of the system to perform additional, fewer, or alternative actions, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processing element," "processor," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processing element." In particular, "a processing element" may include one or more processing elements individually or collectively performing the described functions. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are exemplary only, and are thus not limiting as to the types of memory usable for storage of a computer program.

The terms "computer," "computing device," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "communications network" and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short range communications protocols.

The term "communications element" and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory element," "data storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented method for improving the function of a unified computing system by standardizing equipment identifiers with service profile identifiers in a domain of the unified computing system, wherein the computer-implemented method is performed by a computer, the computer-implemented method comprising:
    (1) accessing a domain list of one or more domains in the unified computing system;
    (2) accessing a particular domain from the one or more domains in the domain list;
    (3) accessing a service profile identifier list of one or more service profile identifiers for the particular domain;
    (4) determining whether a particular service profile identifier in the service profile list is assigned to a particular piece of equipment;
    (5) accessing an equipment identifier list of one or more equipment identifiers for the particular domain;
    (6) finding a particular equipment identifier in the equipment identifier service list assigned to the particular piece of equipment;
    (7) overwriting the particular equipment identifier assigned to the particular piece of equipment to include the particular service profile identifier assigned to the particular piece of equipment;
    (8) repeating steps (3) through (7) of the computer-implemented method at least once per day for each service profile identifier and each equipment identifier for the particular domain,
    wherein steps (1) through (8) of the computer-implemented method are performed by a script executed by a task scheduler on a computer server which is part of a management network for managing the unified computer system; and
    (9) assisting in physically finding and servicing the particular piece of equipment by receiving an electronic query message identifying the particular piece of equipment by the particular service profile identifier, looking up the particular equipment identifier based on the particular service profile identifier, and electronically transmitting an electronic response message containing the particular equipment identifier.

2. The computer-implemented method of claim 1, wherein the particular piece of equipment is a blade server.

3. The computer-implemented method of claim 1, further including setting the particular equipment identifier to a default equipment identifier if the particular piece of equipment has no assigned particular service profile identifier.

4. The computer-implemented method of claim 1, wherein there are two or more domains in the domain list, and further including repeating steps (1) through (8) of the computer-implemented method for each domain of the two or more domains in the domain list.

5. A method to facilitate identifying pieces of equipment in a domain of a unified computing system by standardizing equipment identifiers for the pieces of equipment with service profile identifiers assigned to the pieces of equipment, the method comprising:
    (1) accessing a domain list of one or more domains in the unified computing system;

(2) accessing a particular domain from the one or more domains in the domain list;
(3) accessing a service profile identifier list of one or more service profile identifiers for the particular domain;
(4) determining whether a particular service profile identifier in the service profile list is assigned to a particular piece of equipment;
(5) accessing an equipment identifier list of one or more equipment identifiers for the particular domain;
(6) finding a particular equipment identifier in the equipment identifier service list assigned to the particular piece of equipment;
(7) if the particular equipment identifier assigned to the particular piece of equipment does not include the particular service profile identifier assigned to the particular piece of equipment, then changing the particular equipment identifier to include the particular service profile identifier;
(8) repeating steps (3) through (7) of the computer-implemented method at least once per day for each service profile identifier and each equipment identifier for the particular domain,
wherein steps (1) through (8) are performed by a script executed by a task scheduler on a computer server which is part of a management network for managing the unified computer system;
(9) receiving a message identifying the particular piece of equipment by the particular service profile identifier;
(10) looking up the particular equipment identifier based on the particular service profile identifier;
(11) physically finding the particular piece of equipment based on the particular equipment identifier; and
(12) physically servicing the particular piece of equipment.

6. The method of claim 5, wherein the particular piece of equipment is a blade server.

7. The method of claim 5, further including setting the particular equipment identifier to a default equipment identifier if the particular piece of equipment has no assigned particular service profile identifier.

8. The method of claim 5, wherein there are two or more domains in the domain list, and further including repeating steps (1) through (8) of the method for each domain of the two or more domains in the domain list.

9. A system comprising:
a unified computing system including a domain list of one or more domains in the unified computing system, wherein each domain in the domain list is associated with a service profile identifier list of one or more service profile identifiers and an equipment identifier list of one or more equipment identifiers;
a management network configured to manage the unified computing system, and including a script configured to—
(1) access the domain list of the one or more domains in the unified computing system;
(2) access a particular domain from the one or more domains in the domain list;
(3) access the service profile identifier list of the one or more service profile identifiers for the particular domain;
(4) determine whether a particular service profile identifier in the service profile identifier list is assigned to a particular piece of equipment;
(5) access the equipment identifier list of the one or more equipment identifiers for the particular domain;
(6) find a particular equipment identifier in the equipment identifier list assigned to the particular piece of equipment;
(7) if the particular equipment identifier assigned to the particular equipment does not include the particular service profile identifier assigned to the particular piece of equipment, then change the particular equipment identifier assigned to the particular piece of equipment to include the particular service profile identifier assigned to the particular piece equipment;
(8) repeating steps (3) through (7) at least once per day for each service profile identifier and each equipment identifier for the particular domain; and
(9) assisting in physically finding and servicing the particular piece of equipment by receiving an electronic query message identifying the particular piece of equipment by the particular service profile identifier, looking up the particular equipment identifier based on the particular service profile identifier, and electronically transmitting an electronic response message containing the particular equipment identifier.

10. The system of claim 9, wherein the particular piece of equipment is a blade server.

11. The system of claim 9, further including setting the particular equipment identifier to a default equipment identifier if the particular piece of equipment has no assigned particular service profile identifier.

12. The system of claim 9, wherein there are two or more domains in the domain list, and further including repeating steps (1) through (8) of the script for each domain of the two or more domains in the domain list.

* * * * *